Oct. 12, 1954

H. L. GRIFFIN

2,691,747

CIRCUIT RECLOSING CONTROL

Filed March 5, 1951

INVENTOR.
Herman L. Griffin

Fig. 3.

INVENTOR.
Herman L. Griffin
By his attorneys
Hoopes, Leonard & Glenn

Patented Oct. 12, 1954

2,691,747

UNITED STATES PATENT OFFICE 2,691,747

CIRCUIT RECLOSING CONTROL

Herman L. Griffin, Jefferson, Pa.

Application March 5, 1951, Serial No. 213,909

22 Claims. (Cl. 317—23)

This invention relates to controls for closing electrical circuits, and more particularly to reclosing controls for circuit breakers and the like in electric power systems in mines.

Electric power systems in mines present special problems in the design of reclosing controls for circuit breakers and the like because of special hazards in mines which the reclosing control must be designed to avoid and because of the special operating conditions in mines for which the reclosing control must be adapted. For example, the reclosing control must work with mine voltages which not infrequently vary from full voltage to half of the full voltage, and for well-recognized reasons must never close a circuit until after a substantial time delay following the opening of the circuit. The reclosing control must be accurately responsive to a low critical value of minimum load resistance for reclosing the circuit and at the same time should operate with a small testing current in order to reduce the hazard of fire and explosion. In the case of reclosing controls required to protect electric circuits in mine sections which are infrequently supervised, such as in sections which are dewatered during periods of idle time, the reclosing control should have an intermittent testing current of low average value to reduce fire hazard to the minimum. Moreover, a form of reclosing control is required to satisfy these conditions and also to operate between power sources in a multiple feed system in order to isolate a section not having a short circuit or other overload from a section which does have an overload.

In accordance with my invention reclosing controls are provided which have a time delay unaffected by the amount of increase of the load resistance after the load resistance increases above the predetermined value for closing the circuit, which always give a minimum time delay before reclosing after the circuit has been opened, and which operate accurately with only a small amount of testing current through the load. My reclosing controls have an electrical discharge device connected to pass current to close the circuit breaker, and means for triggering the device connected to load testing circuits, with means controlling the triggering device to give a predetermined time delay in triggering the discharge device after the breaker opens, regardless of whether the load resistance increases from zero to infinity or from zero to a value just above the predetermined closing value. One embodiment of the invention provides continuous testing current which may be of small value.

This embodiment is of relatively simple construction and is particularly suitable where the mine areas traversed by the controlled circuits are under continuous supervision while the reclosing control is in operation. In mine sections where there may not be continuous supervision during operation of the reclosing control I provide reclosing controls which produce and operate on an intermittent testing current through the load circuit of low value during each pulse of current and very low average value over the intermittent cycle as a whole that the danger of fire is largely eliminated. The intermittent current is preferably provided by a discharge device which is triggered at relatively long intervals by another discharge device, such as a relaxation oscillator, and is extinguished after a short interval by another discharge device. I further provide reclosing controls adapted to be placed between power sources in a multiple feed power system, and having a pair of triggering devices preferably connected in series and respectively responsive to load resistance on opposite sides of the associated circuit breaker.

My intermittent testing current reclosing controls are further adapted to respond accurately to changes in the resistance of a load which is connected to the circuit breaker through a long length of trolley wire and is connected in parallel with a number of motors or the like having a low resistance but a high reactance. The inductance of the trolley wire is of a relatively low value but has a strong inductive reactance if there is a sharp change of current at the beginning of each pulse of testing current. This reactance tends to indicate a higher resistance in the load being tested than the true resistance of the load when a large part of the trolley wire is in series with the load being tested. The amount of inductive reactance produced in the trolley wire should therefore be held at a low value in order to avoid reclosing the circuit before the load resistance has reached the predetermined safe minimum amount. On the other hand, inductive loads such as motors connected in parallel with a resistance load tend to indicate a short circuit in the system even after the short circuit condition has been corrected because of their low resistance, and consequently it is desirable to produce a high inductive reactance in these motors to reduce the amount of each pulse of testing current which flows through them. Accordingly, I modify the wave front of each pulse of testing current of my intermittent testing current reclosing controls to provide sufficiently low initial rate of change of current to reduce trolley wire inductive reactance to an insignificantly low value relative to the reclosing resistance value, but high enough to insure a relatively high impedance in the motors connected in parallel with the resistance load. My pulsing test current therefore provides accurate reclosing control with a minimum amount of current.

Further novel features and advantages of the self-closing circuit of my invention will become apparent from the following detailed description and in the accompanying drawings. I have shown in the drawings for purposes of illustration only, certain present preferred embodiments of my invention, in which.

Figure 1:
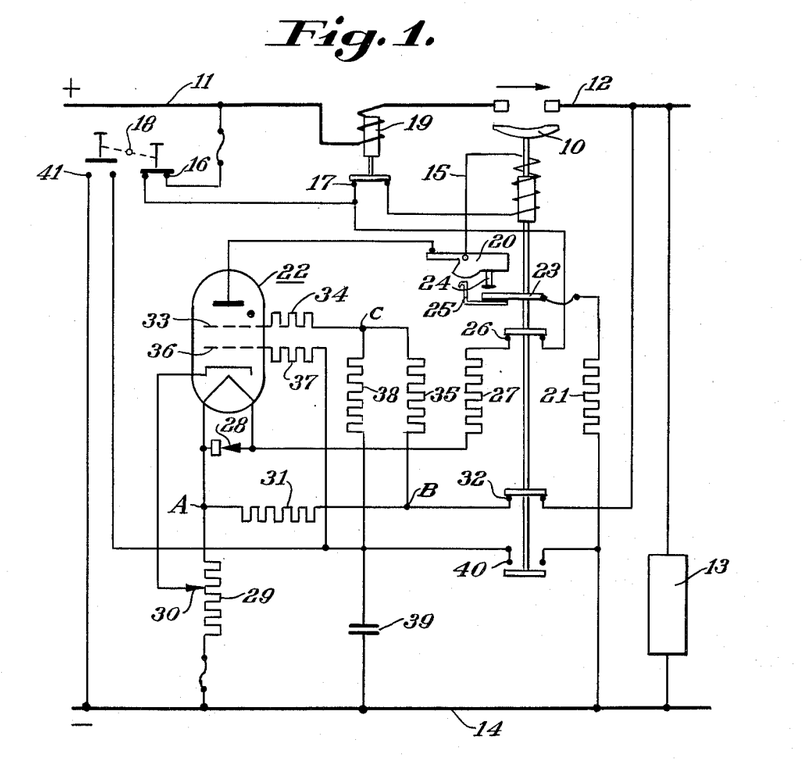
Figures 1, 2 and 3 are diagrammatic illustrations of three forms of self-closing circuit breaker systems embodying my invention.

*Figure 1*

Referring now in more detail to the drawings, the system shown in Figure 1 includes a circuit breaker 10 interposed between a positive power conductor 11 and a load circuit conductor 12. The load is indicated at 13 between the load circuit conductor 12 and a negative return conductor 14. The breaker 10 closes only when current flows through a line 15 connected to the conductor 11 through terminals 16 and 17. The terminals 16 are controlled by an on-and-off switch 18 which controls the circuit breaker system as a whole, and the terminals 17 are opened by an overload solenoid 19 only while current of more than a predetermined amount flows through the conductor 11.

While the breaker 10 is closed current from the conductor 11 flows through the line 15, a switch 20 and resistor 21 to the return conductor 14. When current ceases to flow through the line 15, such as when an overload current opens terminals 17, the breaker 10 opens and mechanically operates the switch 20 to disconnect the line 15 from the resistor 21 and to connect it instead to the plate of a thyratron tube 22. The switch 20 is mechanically biased to pivot about a central point in a clockwise direction as shown in Figure 1, to a horizontal position in which it connects the line 15 with the plate of the tube 22. The breaker 10 is mechanically connected to a conductor bar 23 which is connected through a flexible conductor to the resistor 21. When the breaker 10 is fully open the bar 23 is out of engagement with the contactor 24 and the line 15 is connected by the switch 20 with the plate of the tube 22. When the tube 22 fires the current through the line 15 causes the breaker 10 to move from open position and to carry the bar 23 against the contactor 24, which establishes a flow of current from the line 15 to the resistor 21. This flow causes the breaker 10 to complete its closing movement while the bar 23 against the contactor 24 swings the switch 20 in a counterclockwise direction to disconnect the line 15 from the plate of the tube 22. A latch 25 carried by the bar 23 engages the switch 20 near the end of this movement and prevents return movement of the switch during reopening of the breaker 10 until almost the end of the reopening period. This disengages the bar 23 from the contactor 24 well in advance of the connection of the plate of the tube 22 with the line 15 so that changes of flux resulting from disconnecting the resistor 21 will not momentarily increase the potential on the plate of the tube 22 to such an extent as to fire the tube prematurely, especially if it is still heated from a previous breaker closing operation. In this way the possibility of the breaker 10 pumping back and forth between open and closed positions under short circuit conditions in the load 13 is eliminated.

The grids and cathode of the tube 22 are connected in the galvanometer position in a Wheatstone bridge of which the load 13 forms a part, so that the resistance in the load 13 controls the firing of the tube 22 and thereby controls reclosing of the breaker 10. When the breaker 10 opens it closes terminals 26 and current flows through the conductor 11, terminals 16 and 26, a resistor 27, the cathode heater of the tube 22 in parallel with a nonlinear resistor in the form of a selenium-type rectifier 28, to a terminal A where the Wheatstone bridge begins. A resistor 29 between the terminal A and the return conductor 14 forms one branch of the Wheatstone bridge, and is tapped at an intermediate point 30 by a line connected to the cathode of the tube 22. A resistor 31 and the load 13 between the terminal A and the return conductor 14 form the other branch of the Wheatstone bridge. Terminals 32 which open and close inversely with the breaker 10 are interposed between the resistor 31 and conductor 12, and the shield grid 33 of the tube 22 is connected through resistors 34 and 35 to a terminal B between the resistor 31 and terminals 32. The control grid 36 of the tube 22 is connected through resistors 37 and 38 to a terminal C between the resistors 34 and 35.

A capacitor 39 delays the firing of the tube 22 after the resistance of the load 13 increases to or exceeds the load resistance at which the breaker 10 is set to close. This capacitor is connected on one side between the resistors 37 and 38 and on the other side to the return conductor 14, and together with resistor 38 retards the rise of voltage of control grid 36. The operation of the capacitor 39 and of the other elements of the grid circuit depends upon the operation of and flow of current through the other parts of the reclosing control circuit, which will now be considered.

The resistance of the resistor 27, of the parallel circuit of the cathode heater and rectifier 28, and of the Wheatstone bridge itself determine the current flow for testing purposes. The minimum flow of current through the terminals 26 is limited by the requirements of the cathode heater of the tube 22 at the lowest value of mine voltage, and there must also be sufficient current to make the tube 22 responsive to changes in resistance in the load 13 for closing the breaker 10. More current is required to close the breaker 10 at low values of minimum reclosing load resistance than at higher values. The values selected for reclosing depend on service conditions, subject to the inherent capabilities of the reclosing circuit at low reclosing load resistance values.

The voltage of terminal A is a direct function of the resistance and the amount of current through the two branches of the Wheatstone bridge, and since all the resistors of the Wheatstone bridge are fixed except the load resistance the potential of the terminal A is a direct function of the value of the load resistance for any given current flow. The cathode of tube 22 always has a potential which is a constant fraction of the potential at terminal A, as a result of the connection of the cathode through tap 30 to resistor 29.

At zero load resistance both grids 33 and 36 of tube 22 are at zero potential, as they obtain their voltage from terminal B, and under this condition the flow of current through the Wheatstone bridge must be enough to give the cathode a potential well above the level required to prevent firing of the tube 22. The attainment of this result determines the minimum values of the resistors 31 and 29, and more especially the portion of 29 between the tap 30 and the return conductor 14. The maximum values of these resistors are determined by the required amount of cathode heater current, particularly at minimum mine voltage, and by the amount of minimum reclosing load resistance value for which the system is to be set. The system can be made responsive to a lower value of minimum reclosing load resistance by connecting a nonlinear resistor, such as a selenium-type rectifier between the resistor 29 and return conductor 14.

The potential at terminal B is zero when the resistance in load 13 is zero, and has the potential of terminal A when the resistance of load 13 is infinitely large. As the load resistance begins to increase from zero the potential of terminal B, which begins below that of terminal A, increases at a higher rate than terminal A, and the potential of terminal B becomes equal to that of terminal A at a value of the load resistance determined by the relative value of the two portions of resistor 29 and also by the value of the resistor 31. The tube 22 fires when the grids 33 and 36 rise to certain potentials below that of the cathode, which potentials are interdependent. At values of load resistance at or below the predetermined minimum load resistance both grids eventually attain the same potential and will not fire the tube 22 if the load resistance remains below that value but will eventually fire the tube if the load resistance goes above that value.

Time delay in firing the tube 22 after the load resistance reaches the minimum predetermined reclosing value is attained by delaying the rise of potential of the control grid 36 during charging of the capacitor 39, and this delay is controlled by the resistor 38 which limits the flow of current to the capacitor 39. The potential at terminal C also controls the charging of the capacitor 39, and is effective to hold the capacitor 39 to a substantially constant charging rate regardless of variations of load resistance above the predetermined reclosing load resistance value. This is because after the potential of terminal C increases to a value slightly below the cathode potential, the shield grid 33 begins to draw current by grid rectification and the flow of this current through the resistors 34 and 35 controls the potential of the terminal C and prevents it from rising substantially above a desired value for charging the capacitor 39 preliminary to firing the tube 22, even if the load resistance increases to infinity. Thus by selecting the values of resistors 34 and 35 the rate of rise of potential of the terminal C above the cathode in response to increases in resistance of load 13 is controllable within sufficient limits to provide practically constant time delay for values of load resistance between slightly above the predetermined reclosing load resistance value and infinite load resistance. Instead of relying upon grid rectification current to control the potential of the terminal C, such as in case a triode is substituted for the thyratron tube 22, the same results can be approximated by connecting a selenium-type rectifier between the tube cathode and the terminal C.

A valuable feature of this system is that there must always be some time delay after the load resistance reaches the minimum reclosing value, regardless of amounts or fluctuations of the load resistance values. In the vast majority of cases the load resistance changes from substantially zero to a value well above the minimum reclosing resistance for which the system is set, and the normal timing period follows before the tube 22 fires and closes the breaker 10. It is possible for the time delay to be increased if the load resistance rises and remains within a very narrow range of resistance values so close to the exact predetermined closing value as to be of no significance for practical purposes. If the load resistance rises to an intermediate value below the predetermined minimum closing value and then increases above the latter value for a period until the tube 22 fires, the time delay after the increase is less than the usual time delay as a result of partial charging of the capacitor 39 during the period before the increase, but there will always be an appreciable time delay after the increase in any event. The reclosing time delay after opening of the breaker 10 is decreased only in the rare case where the load resistance is suddenly reduced after it has remained for the major portion of the usual delay time at a value well above the load resistance for which the control is set to close the breaker. This is not considered serious for practical purposes and is avoidable if desired by connecting a capacitor between the control grid 36 and cathode of the tube 22, and by connecting a selenium-type rectifier between point B and the lead connecting the capacitor 39 with the resistor 38.

When the breaker 10 closes it opens the terminals 26 and 32 to disconnect the reclosing circuit from the conductors 11 and 12, and closes terminals 40 to discharge the capacitor 39 to the return conductor 14 in order to insure full timing of the capacitor 39 in subsequent operations. The on-and-off switch 18 is operable to open the terminals 16 to disconnect the breaker 10 from the control circuit and simultaneously to close terminals 41 to discharge the capacitor 39.

The sequence of operations of the system shown in Figure 1 is as follows if a short circuit occurs in the load 13 while there is potential on the conductor 11 and the breaker 10 and terminals 16 and 17 are closed. The overload current resulting from the short circuit energizes the solenoid 19 to open the terminals 17 and thereby to cause the breaker 10 to open as a result of current ceasing to flow through the line 15. As soon as the breaker 10 opens the solenoid 19 becomes de-energized and the terminals 17 reclose. In the meanwhile the opening of the breaker 10 opens the terminals 40, closes the terminals 26 and 32, and switches the connection with the line 15 from the resistor 21 to the plate of the tube 22. Current then flows from the conductor 11 through terminals 16 and 26, resistor 27, cathode heater of tube 22 and parallel rectifier 28, and thence partly through resistor 29 and partly through resistor 31, terminals 32 and load 13 to the return conductor 14. Even if the short circuit condition is immediately corrected, the capacitor 39 insures a time delay sufficient to heat the cathode of the tube 22, and after the resistance in the load 13 is increased above the predetermined minimum safe level the potential at terminal B increases accordingly and after the interval required for charging the capacitor 39 the tube 22 fires and the resultant plate current from the conductor 11 through the terminals 16 and 17, line 15, switch 20, tube 22, tap 30, and lower portion of resistor 29 to the return conductor 14 energizes the breaker 10 and closes it. This disconnects the line 15 from the plate of the tube 22, which thereupon becomes extinguished, and connects the line 15 to the return conductor 14 through the resistor 21, so that the breaker 10 is held closed by current flowing from the conductor 11 through the terminals 16 and 17, line 15 and resistor 21 to the return conductor 14. When the breaker 10 closes is opens the terminals 26 and 32 to disconnect the reclosing circuit from the conductors 11 and 12, and closes terminals 40 to discharge the condenser 39.

Figure 2:
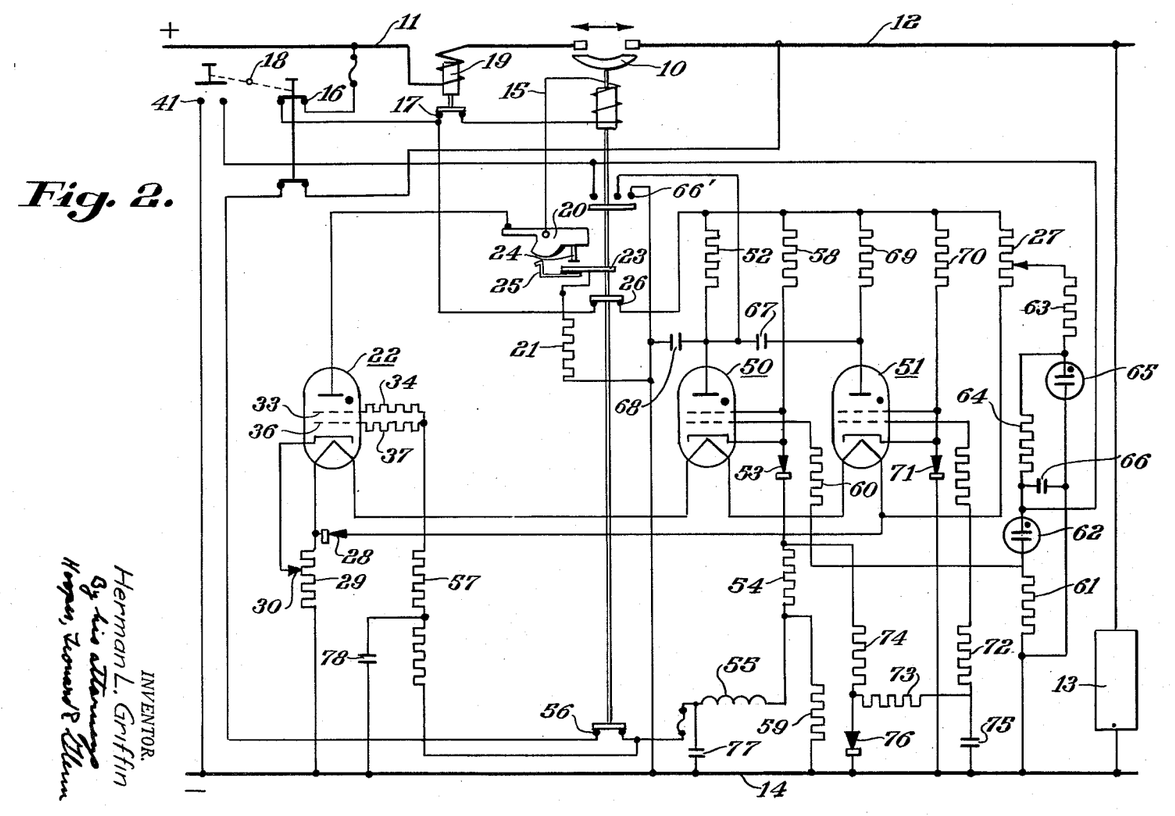

*Figure 2*

The form of automatic reclosing circuit breaker system shown in Figure 2 provides periodic short pulses of testing current instead of the steady testing current provided by the system shown in Figure 1. The principal advantage of periodic pulses of current is that each pulse may be made strong enough to provide a suitable testing current but of short enough duration to avoid substantial fire hazard resulting from the heating effect of a large continuous current in the part of the load having the short circuit.

The system shown in Figure 2 includes the circuit elements 10–30, 33, 34, 36 and 37 corresponding to the elements of the same numbers described above in connection with Figure 1. The firing of the tube 22 controls the closing of the breaker 10 in the manner previously described, but the grids of the tube 22 are connected to a different control circuit. The cathode heater of the tube 22 is connected in parallel with the rectifier 28 to receive current through the terminals 26 and resistor 27 as previously described, except that the cathode heaters of two additional thyratron tubes 50 and 51 are connected in series with the cathode heater of the tube 22. The resistor 29 connects the cathode heater circuit to the return conductor 14 in the manner previously described. The Wheatstone bridge circuit is modified and begins at the terminals 26, with one branch of the circuit extending through the resistor 27, through the parallel circuit of cathode heaters and rectifier 28, and through the resistor 29 to the return conductor 14. The other branch runs from the terminals 26 through a resistor 52, through the anode and cathode of the tube 50, and through a nonlinear resistor in the form of selenium-type rectifiers 53, a resistor 54, an inductor 55, terminals 56 which are closed only while the breaker 10 is open, load conductor 12 and load 13 to the return conductor 14. The cathode of the tube 22 is connected at 30 to an intermediate portion of the resistor 29 to form one part of the galvanometer circuit of the Wheatstone bridge, and the grid resistors 34 and 37 of the tube 22 are tied together and are connected through a resistor 57 between the terminals 56 and inductor 55 to form the other portion of the galvanometer circuit of the Wheatstone bridge.

Current through the load branch of the Wheatstone bridge is controlled by the tube 50 and flows in intermittent short pulses through the load 13. The plate of the tube 50 has the potential of the conductor 11 while the terminals 16 and 26 are closed and there is no plate current through the tube 50. The cathode of the tube 50 is given a potential above that of the return conductor 14 as a result of a flow of current from the terminals 26 through a resistor 58, rectifier 53, resistor 54 and a resistor 59 to the return conductor 14. The cathode and also the shield grid of the tube 50 are connected between the resistor 58 and rectifier 53, which rectifier serves to elevate the potential of the cathode to obtain negative bias of the grids to the cathode during nonconductive periods of the tube 50. The control grid of the tube 50 is connected to the return conductor 14 through resistors 60 and 61 and has a potential well below the level required for firing the tube 50 except when it receives an impulse from a glow discharge tube 62 which has its cathode connected between the resistors 60 and 61. The anode of the tube 62 is connected to an intermediate portion of the resistor 27 through resistors 63 and 64, and a voltage regulating glow discharge tube 65 and a timing capacitor 66 are connected in parallel with the timing resistor 64. The resultant relaxation oscillator circuit fires the tube 62 at regular intervals. The initial interval between opening of the breaker 10 and the first discharge of the tube 62 is determined by the full period of charging the capacitor 66 to the voltage required to fire the tube 62. The succeeding intervals are shorter because the tube 62 becomes extinguished when the voltage between its plate and cathode reaches an intermediate value between zero and the firing voltage, and it takes less time for the capacitor to recharge to the firing voltage from the intermediate voltage than from zero voltage. In order to insure full initial timing of the capacitor after the breaker 10 opens terminals 66' are connected to open and close with the breaker 10 and discharge the capacitor 66 to return conductor 14 when the breaker 10 closes.

The period of conduction of the tube 50 is controlled by the tube 51, which has its plate connected to the plate of the tube 50 through a commutating capacitor 67 so that the drop in potential on the plate of the tube 51 upon firing of that tube will discharge the capacitor 67 and lower the potential on the plate of the tube 50 to such an extent as to extinguish the plate current through the tube 50. A stabilizing capacitor 68 is connected between the plate of the tube 50 and the return conductor 14, and when breaker 10 closes terminals 66' close to discharge the capacitors 67 and 68. A resistor 69 connects the plate of the tube 51 to the terminals 26, and the shield grid and cathode of the tube 51 are connected to the terminals 26 through a resistor 70 and to the return conductor 14 through a nonlinear resistor in the form of a selenium-type rectifier 71, in a manner corresponding to the plate, shield grid and cathode connections of the tube 50 except for the absence of resistors between the rectifier 71 and the return conductor 14. The firing of the tube 51 is controlled by its control grid, which is connected through resistors 72, 73 and 74 to a point between the resistor 54 and rectifier 53. A timing capacitor 75 is connected on one side between the resistors 72 and 73 and on the other side to the return conductor 14, and a nonlinear resistor in the form of a selenium-type rectifier 76 is connected on one side between the resistors 73 and 74 and on the other to the return conductor 14 to make uniform the rate of charging of the capacitor 75 when tube 50 conducts and there is a heavy flow of current through the rectifier 53. The capacitor 75 charges over a predetermined period to the level necessary to trigger the control grid of the tube 51 to fire the tube 51. This period is adjustable to control the duration of each pulse of testing current, such as a fraction of a second for average mining purposes. When the tube 51 finally fires its plate drops in potential close to the holding voltage of the rectifier 71 and this causes the commutating capacitor 67 to lower the potential of the plate of the tube 50 to such an extent as to extinguish the plate current through the tube 50. The potential between the resistor 54 and rectifier 53 then drops and the capacitor 75 discharges through the resistors 73, 74, 54 and 59. The resistor 69 is preferably of such high value that its voltage drop after the tube 51 fires lowers the anode potential of the tube 51 to such an extent as to extinguish the tube 51, and the capacitor 67 has a value relative to the value of the resistor 69 for holding down the potential of the anode of the tube 51 below firing level after the tube 51 first becomes extinguished for sufficient time to prevent the anode from reaching firing voltage before the tube 51 deionizes.

The pulse of plate current through the tube 50 has a steep wave front with an initial peak which would tend to add reactance to resistance in the load circuit and thus interfere with the response of the tube 22 to changes of resistance in the load 13. Accordingly, filter elements in the form of the inductor 55 and a capacitor 77 connected on one side to the return conductor 14 and on the other between the inductor 55 and terminals 56 serve to modulate the wave so that the inductive reactance produced in trolley wire in the conductor 12 is reduced to an insignificant value relative to the predetermined minimum reclosing load resistance while the inductive reactance of any low resistance inductive loads paralleling load 13 is held at a relatively high value. The effect of reactance in the load circuit is thereby minimized so that the potential on the grids of the tube 22 will vary substantially only in response to changes in resistance of the load 13 and will rise to the level required for firing the tube 22 only when the resistance in the load 13 has reached a predetermined minimum safe amount. A capacitor 78 connected between the return conductor 14 and an intermediate portion of the resistor 57 also aids in achieving this result by absorbing current fluctuations at the beginning of each pulse of testing current.

In some cases the tube 51 may be omitted with its appurtenant elements such as elements 67 and 70—76, and the pulse of testing current will be supplied by the capacitor 68. In this case the value of resistor 52 must be increased enough to extinguish the tube 50 while still permitting sufficient flow of charging current to capacitor 68.

The sequence of operations of the system shown in Figure 2 is as follows if a short circuit occurs in the load 13 while there is potential on the conductor 11 and the breaker 10 and terminals 16 and 17 are closed. The overload current resulting from the short circuit energizes the solenoid 19 to open the terminals 17 and thereby to cause the breaker 10 to open as a result of current ceasing to flow through the line 15. As soon as the breaker 10 opens the solenoid 19 becomes deenergized and the terminals 17 reclose. In the meanwhile the opening of the breaker 10 operates the switch 20 to disconnect the line 15 from the resistor 21 and to connect it to the plate of the tube 22. The opening of the breaker 10 also closes the terminals 26 and 56 and a potential appears on the plates of the tubes 50, 51, 62 and 65, and current flows through the resistor 27 to heat the cathodes of the tubes 22, 50 and 51, to give the cathode of the tube 22 a positive potential relative to the return conductor 14, and to start charging of the timing capacitor 66 in the relaxation oscillator circuit. After a predetermined time, which is at least enough for the cathodes of the tubes 22, 50 and 51 to be heated, the tube 62 fires and triggers the control grid of the tube 50 to fire the tube 50. Heavy plate current in the tube 50 then flows through the load branch of the Wheatstone bridge and some of this current also begins to charge the timing capacitor 75. If the resistance in the load 13 is still below the predetermined minimum limit for closing the breaker 10, the increase of potential on the grids of the tube 22 is not sufficient to fire the tube 22 and after a predetermined fraction of a second the capacitor 75 triggers the control grid of the tube 51 to fire the tube 51 and thereby to extinguish the tube 50. This terminates the pulse of testing current and the high voltage drop through the resistors 69 serves to extinguish the tube 51 after it has extinguished the tube 51. The timing capacitor 66 of the relaxation oscillator circuit has in the meanwhile been recharging and after its timing period the tube 62 is again fired and another pulse of testing current is sent through the load branch of the Wheatstone bridge. Assuming that the resistance in the load 13 is now above the predetermined minimum value for closing the breaker 10, the resultant increase of potential on the grids 33 and 36 of the tube 22 causes the tube 22 to fire and the plate current through the tube 22 from the line 15 closes the breaker 10, which in turn opens the terminals 26 and 56, closes the terminals 66' and operates the switch 20 to disconnect the line 15 from the plate of the tube 22 and to connect the line 15 to the resistor 21. This disconnects the reclosing circuit from the conductor 11, extinguishes the tubes 22 and 50, discharges the timing capacitor 66, and establishes a flow of current between the conductors 11 and 12 and through the line 15 and resistor 21 to hold the breaker 10 closed.

Figure 3:
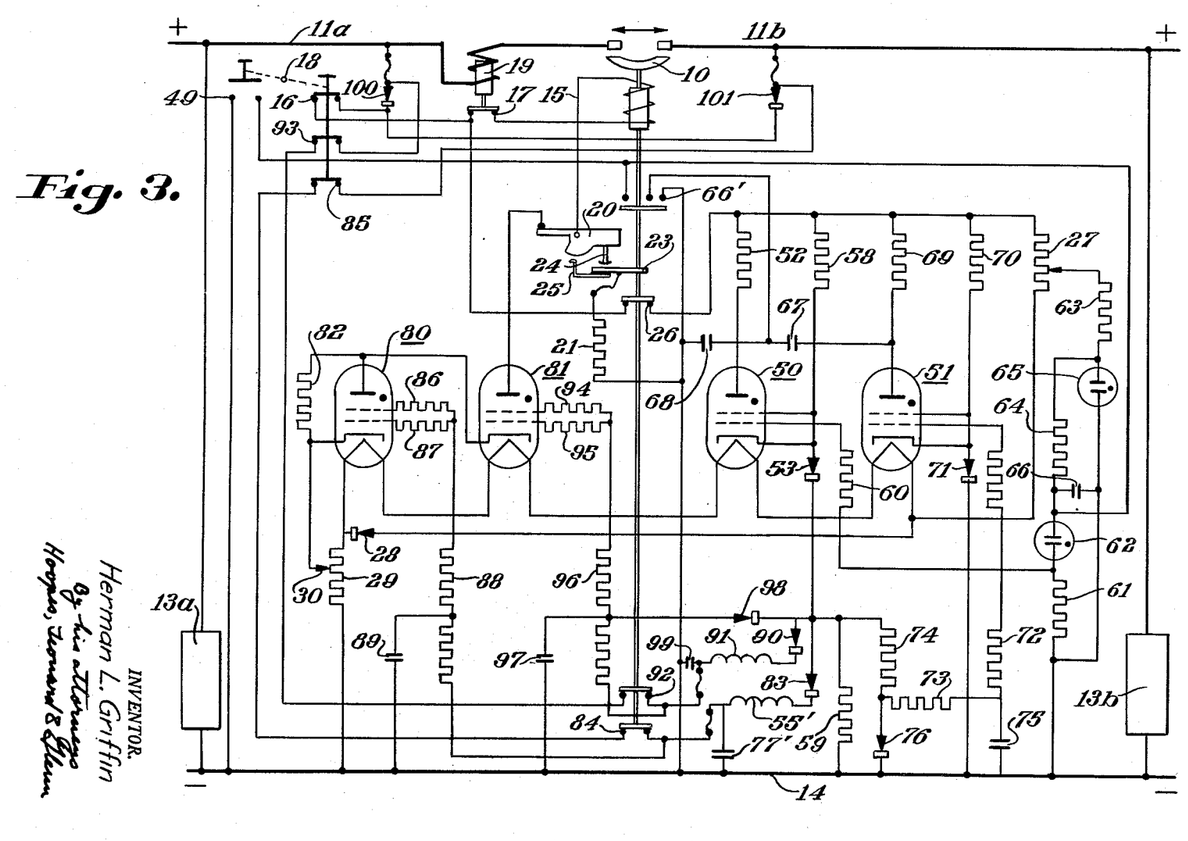

*Figure 3*

The form of automatic reclosing circuit breaker system shown in Figure 3 has an impulse testing circuit which operates like the system shown in Figure 2 but can be placed between two power circuits to disconnect them when a short circuit or other overload occurs in either of them.

The system shown in Figure 3 includes the circuit elements 10, 14–21 and 23–30 corresponding to the elements of the same numbers described above in connection with Figure 1, and circuit elements 50–53 and 59–76 corresponding to the elements of the same numbers described above in connection with Figure 2. The tubes 62 act in the same way to fire the tube 50 periodically, and the tube 51 acts in the same way to extinguish the tube 50 after it has sent a pulse of testing current through the rectifier 53 as previously described. The tube 22, however, is replaced by a pair of thyratron tubes 80 and 81. The tube 80 is responsive to changes of resistance in a load 13b, which is connected between the return conductor 14 and a positive power conductor 11b, and the tube 81 is responsive to changes of resistance in a load 13a between the return conductor 14 and positive power conductor 11a. The cathode heaters of the tubes 80 and 81 are connected in parallel with the rectifier 28 to receive heating current, and the plate of the tube 81 is connected to the switch 20 in the same manner as the plate of the tube 22 in Figures 1 and 2. The cathode of the tube 81 is connected to the plate of the tube 80 and also through a high value resistor 82 to the cathode of the tube 85 and to the intermediate point 30 on the resistor 29. The effect of these connections is to place the tubes 80 and 81 in series so that the grids of either of these tubes can prevent the firing of both of the tubes. The plate of the tube 81 is connected to the switch 20 in the same way as the plate of the tube 22 in Figures 1 and 2, and plate current through the tubes 80 and 81 is necessary to reclose the breaker 10 in the same way as plate current through the tube 22 in Figures 1 and 2. A short circuit in either of the loads 13a or 13b will prevent one or the other and therefore both of the tubes from conducting and thereby will prevent closing of the breaker 10 until the overload or short circuit is corrected.

The load 13b is in a Wheatstone bridge which begins at the terminals 26 and has one branch extending through the following elements: resistor 52, tube 50, rectifier 53 and similar rectifier 83, inductor 55', terminals 84 and 85, conductor 11b, load 13b and return conductor 14. The other branch of this bridge extends from the terminals 26 through the resistor 27, the parallel circuit of the rectifier 28 with the cathode heaters of the tubes 50, 51, 80 and 81, resistor 29 and the return conductor 14. The galvanometer circuit of this Wheatstone bridge extends from the tap 30 in the resistor 29 to the cathode of the tube 80, and from the grids of the tube 80 through their resistors 86 and 87 and thence through a resistor 88 to the connection between the terminals 84 and inductor 55'. A capacitor 89 is connected between an intermediate portion of the resistor 88 and return conductor 14 in the same manner and for the same purpose as the capacitor 78 in Figure 2, and a capacitor 77' is connected to the inductor 55' in the same manner and for the same wave filtering purpose as the capacitor 77 and inductor 55 are connected in Figure 2.

The load 13a forms part of a Wheatstone bridge having one branch in common with the Wheatstone bridge which includes the load 13b, namely the branch extending from the terminals 26 through the resistors 27 and 29 to the return conductor 14. The other branch of the Wheatstone bridge which includes the load 13a extends from the terminals 26 through the resistor 52, tube 50, rectifier 53, a similar rectifier 90, an inductor 91, terminals 92 and 93, conductor 11a, load 13a and return conductor 14. The galvanometer circuit of this Wheatstone bridge extends from the tap 30 in the resistor 29 through the resistor 82 to the cathode of the tube 81, and from the grids of the tube 81 through their resistors 94 and 95 and through a resistor 96 to the connection between the terminals 92 and inductor 91. A capacitor 97 corresponding to the capacitor 89 is connected to an intermediate portion of the resistor 96 and to the return conductor 14, and a nonlinear resistor in the form of a selenium-type rectifier 98 is connected between said intermediate portion of the resistor 96 and the resistor 59 to hold the grids of tube 81 close to potential of return conductor 14 while the tube 50 is non-conductive. A capacitor 99 is connected between the inductor 91 and the return conductor 14 to cooperate with the inductor 91 in filtering the wave impulses from the tube 50 passing to the load 13a and to the grids of the tube 81.

In order to power the reclosing circuit in the event of a short circuit in either of the loads 13a or 13b, the conductor 11a is connected to the conductor 11b through opposed selenium-type rectifiers 100 and 101, and the inlet side of the terminals 16 is connected between these rectifiers so that terminals 16 will receive current from the one of the conductors 11a and 11b which has the higher voltage. The terminals 85 and 93 are connected to open and close with the terminals 16 for manually disconnecting the reclosing circuit, and the terminals 26, 84 and 92 are connected to open and close inversely with the breaker 10 in order to place the reclosing circuit in operation when the breaker 10 is open and to disconnect it when the breaker 10 is closed.

In normal operation with at least a predetermined safe resistance in the loads 13a and 13b, with power connected to either or both of the conductors 11a or 11b, and with the manually operated terminals 16, 85 and 93 closed, current through the line 15 and resistor 21 holds the breaker 10 closed. If the resistance in the load 13b, for example, then drops below the predetermined safe limit for which the system is set, any direct power connection with the conductor 11b would be short circuited through the load 13b and power would also be drawn from the conductor 11a through the breaker 10 and the conductor 11b to the load 13b until the excess current causes the solenoid 19 to open the terminals 17, which de-energizes the line 15 and thereby causes the breaker 10 to open. This in turn de-energizes the solenoid 19 and causes the terminals 17 to close. In the meanwhile the opening of the breaker 10 causes the switch 20 to disconnect the line 15 from the resistor 21 and connect it to the plate of the tube 81. At the same time the terminals 26 are closed and the timing of the glow discharge tube 62 begins. At the end of this period the tube 62 fires and thereby fires the tube 50. A pulse of current then flows through rectifier 53. The mine potential on the conductor 11a raises the potential on the grids of the tube 81 to the level required for firing the tube 81 only while tube 50 is conducting, as will hereinafter be explained in more detail. However, the resultant plate current through the tube 81 is limited below the amount required to close the breaker 10 by high resistance of the resistor 82 while the tube 80 is nonconductive, and increases enough to close the breaker 10 only after tube 80 fires. The rectifier 90 will not pass current from the conductor 11a to the rectifier 53, and current the other way through the rectifier 90 is blocked by the relatively high potential on the conductor 11a. Current from the rectifier 53 flows through the rectifier 83 and is filtered by inductor 55' and capacitor 77' before passing through terminals 84 and 85, conductor 11b and load 13b to the return conductor 14. The short circuit in the load 13b holds the potential of the grids of the tube 80 below the level required for firing the tube 80. This prevents the tube 80 from firing and thereby prevents sufficient current from flowing through the line 15 for closing the breaker 10. The pulse of current through the rectifier 53 also charges the capacitor 75 and after a brief interval the tube 51 fires and extinguishes the tube 50, thereby terminating the pulse of testing current through the rectifier 53. This cycle is repeated at periods determined by the oscillator circuit of tube 62, until the resistance in the load 13b is restored to a value above the minimum safe limit required to raise the potential of the grids of the tube 80 to the level required for firing the tube 80. Thereafter the next pulse of testing current from the tube 50 causes the tube 80 to conduct and current through the tubes 80 and 81 then closes the breaker 10. The closing of the breaker 10 operates the switch 20 to reestablish the connection between the line 15 and resistor 21. The terminals 26, 84 and 92 then open to disconnect the reclosing circuit from the conductors 11a and 11b, and the multiple terminals 66' close to discharge the capacitors 66, 67 and 68.

In case a short circuit occurs in the load 13a instead of in the load 13b the system operates similarly. The potential in conductor 11b raises the potential of the grids of the tube 80 to the level required for firing the tube 80. The rectifier 83 will not pass current from the conductor 11b to the rectifier 53, and current the other way through the rectifier 83 is blocked by the relatively high potential on the conductor 11b. During each pulse of testing current the grids of the tube 81 remain at a potential below that required to fire the tube 81 as long as there is a short circuit in the load 13a, and this prevents any flow of current through the line 15 to close the breaker 10. After the resistance of the load 13a has been restored to at least the predetermined reclosing value for which the system is set, the next pulse of testing current from the tube 50 will raise the potential of the grids of the tube 81 to the conducting level and the tubes 80 and 81 will then fire in series with a resultant closing of the breaker 10 as previously described.

In case there is potential on both of the conductors 11a and 11b immediately after the breaker 10 opens the tubes 80 and 81 are prevented from prematurely conducting in series before the first pulse of current from the tube 50, by holding the grids of the tube 81 below firing level until the tube 50 conducts. The grids of the tube 81 are held at a low potential substantially equal to the forward voltage of the rectifier 98 by voltage drop across the lower part of the high value resistor 96 as a result of current flow from the conductor 11a through the lower part of the resistor 96, rectifier 98 and low value resistor 59. When there is a pulse of current from the tube 50 under these conditions the flow through the rectifier 98 is blocked and the potential of the grids of the tube 81 is raised sufficiently to make tube 81 conductive, whereupon tubes 80 and 81 conduct in series to close the breaker 10.

While I have shown and described present preferred embodiments of the invention it will be recognized that the invention is not limited thereto but may be variously embodied and practiced within the scope of the following claims.

I claim:

1. A reclosing control for a circuit interrupter, comprising an electric discharge device, means responsive to the conductive condition of the discharge device for closing the circuit interrupter, trigger means for making the discharge device conductive in response to a level of potential of the trigger means, a control circuit connected to the trigger means and adapted to be connected to a load circuit for changing the potential of the trigger means to at least said level after the load resistance becomes at least equal to a predetermined minimum resistance for closing the circuit interrupter, said control circuit including a resistor-capacitor timing circuit connected to control the time of said changing of the potential of the trigger means after the load circuit resistance becomes at least equal to said predetermined minimum resistance, and means operated in response to movement of the interrupter to connect the opposite sides of the capacitor of said timing circuit through a very low resistance conductor when the interrupter closes, whereby the capacitor discharges immediately upon closing the conductor and the timing cycle of the timing circuit always delays reclosing the interrupter after the interrupter opens even in case of restoration of high load resistance just as the interrupter opens.

2. In a circuit control system having a portion of widely varying potential, a discharge device to be triggered by potential at said portion beyond a predetermined intermediate value existing for a substantial minimum period, trigger means to discharge said device in response to a predetermined level of potential on the trigger means, a capacitor, a resistor connected between said control system portion and one side of the capacitor, said one side of the capacitor being connected to the trigger means and the other side of the capacitor being connected to have a constant low potential, and means to limit the charging potential impressed on the said one side of the capacitor to a substantially constant value while the potential of said control system portion is at any value above its said predetermined intermediate value, whereby the capacitor is charged to operate the trigger means after a substantially unvarying delay regardless of variations of potential of said portion above its said intermediate value.

3. A reclosing control for a circuit interrupter, comprising an electronic tube with its anode and cathode connected to close the interrupter when the tube discharges, a grid to trigger said tube in response to a raised level of potential on the grid, a control circuit including a portion of widely varying potential in response to varying load conditions in a main circuit, said control circuit including a capacitor, a resistor connected between said circuit portion and one side of the capacitor, said one side of the capacitor also being connected to the grid and the other side of the capacitor being connected to have a constant low potential, and means establishing a circuit between said one side of the capacitor and the tube cathode to bleed current to the cathode and thereby limit the charging potential impressed on the said one side of the capacitor to a substantially constant value while the potential of said circuit portion varies between its said predetermined intermediate value and a substantially higher maximum value, whereby the capacitor is charged to trigger the tube after a substantially unvarying delay regardless of variations of potential of said circuit portion between its said intermediate and maximum values.

4. A reclosing control for a circuit interrupter, comprising a multiple grid discharge tube, means responsive to close the circuit interrupter when the tube becomes conductive, a control circuit adapted to connect a power circuit and a load circuit and having a portion of varying potential in response to varying resistance in the load circuit, a first resistor, a shield grid of the tube connected through said resistor to said control circuit portion, a second resistor connected at one end between the shield grid and first resistor, a capacitor on one side connected to have constant potential and on the other side connected to the other end of the second resistor, and a control grid of the tube connected to said other side of the capacitor, whereby grid rectification current of the shield grid regulates charging of the capacitor in response to varying potential of the said control circuit portion.

5. A reclosing control for a circuit interrupter, comprising an operating circuit adapted to be connected to a power circuit and adapted to close an interrupter in the power circuit when there is substantial current through the operating circuit, and a control circuit adapted to be connected to a load circuit for reclosing the interrupter after resistance in the load circuit rises above a predetermined minimum level, said control circuit including an arc-type discharge device connected to pass current through the operating circuit when the discharge device is conductive for reclosing the interrupter, a Wheatstone bridge circuit adapted to include said load resistance in one leg thereof, the discharge device being connected in the galvanometer position across the Wheatstone bridge to cause the device to discharge after the load resistance rises above said predetermined level, and a heater element of the discharge device connected in series between one end of the Wheatstone bridge and said power circuit, whereby the heating current for the discharge device also acts as testing current in the Wheatstone bridge.

6. A reclosing control for a circuit interrupter for an electric power system comprising an electric discharge device having a cathode heater therein, a conductive circuit for connecting said heater to the power system to receive heating current, and a nonlinear resistor connected in parallel with the heater and effective to hold current through the heater relatively constant during substantial variations of potential of the power system.

7. A reclosing control for a circuit interrupter, comprising an operating circuit adapted to be connected to a power circuit and adapted to close an interrupter in the power circuit when there is substantial current through the operating circuit, and a control circuit adapted to be connected to a load circuit for reclosing the interrupter after resistance in the load circuit rises a predetermined minimum level, said control circuit including an arc-type discharge device connected to pass current through the operating circuit when the discharge device is conductive for reclosing the interrupter, a Wheatstone bridge circuit adapted to include said load resistance in one leg thereof, the discharge device being connected in the galvanometer position across the Wheatstone bridge to cause the device to discharge after the load resistance rises above said predetermined level, and a heater element of the discharge device connected in series between one end of the Wheatstone bridge and said power circuit, with a nonlinear resistor connected in parallel with said heater element and effective to hold current through the heater element relatively constant during substantial variations of potential of the power system, whereby all of the testing current for the Wheatstone bridge passes through the parallel circuit of the heater element and the nonlinear resistor.

8. Apparatus according to claim 5, including a resistor connected in series with the parallel circuit of the heater element and nonlinear resistor between the Wheatstone bridge and the power circuit to limit current flowing to the load circuit without affecting the balance of the Wheatstone bridge.

9. A reclosing control for a circuit interrupter, comprising an operating circuit adapted to be connected to a power circuit and adapted to close the interrupter and hold it closed while there is substantial current through the operating circuit, a control circuit adapted to be connected to a load circuit and including an electric arc-type discharge device for closing the interrupter when the device is conductive, means in the control circuit to make the device conductive when the interrupter is open and after the load circuit resistance becomes at least equal to a predetermined value, a conductor adapted to be connected to the operating circuit to permit the operating circuit to pass substantial current, a movable switch controlling the connections between the operating circuit and the discharge device and conductor respectively, means urging the switch toward a position in which the interrupter operating circuit is connected to the discharge device and not to the conductor, means responsive to movement of the interrupter for moving said switch from said position to connect the interrupter operating circuit to the conductor and then to disconnect it from the discharge device as the interrupter moves from open to closed position, and a detainer releasably engaging the switch after the switch has moved to a position in which it disconnects the interrupter circuit from the discharge means, said detainer being adapted to hold the switch in said last-mentioned position during movement of the interrupter from open to closed position until the interrupter is close to the end of its opening travel, whereby the holding of the switch by the detainer and the subsequent return movement of the switch before it connects the interrupter opertaing circuit with the discharge device delays this connection in order to avoid premature discharge of the device.

10. A reclosing control for a circuit interrupter, comprising an operating circuit adapted to be connected to a power circuit and including an inductor to close the interrupter while there is substantial current through the operating circuit, a control circuit adapted to be connected to a load circuit and connected to the operating circuit to establish current in the operating circuit inductor for reclosing the main interrupter after the load circuit resistance rises above a predetermined safe level, an arc-type discharge device having its anode and cathode connected in the control circuit to draw said current when the device discharges, said device being adapted to discharge after a substantial period following increase of load resistance above said predetermined level, means responsive to excessive current in the power circuit to disconnect the power circuit from the inductor to allow the interrupter to open, means responsive to opening movement of the interrupter to connect the power circuit to the control circuit, and means to prevent the relative potential between the anode and cathode of the discharge device from reaching a value sufficient to fire the discharge device when the interrupter initially opens.

11. A reclosing control for a circuit interrupter, comprising an electric discharge device, means responsive to the conductive condition of the discharge device for closing the circuit interrupter, trigger means for making the discharge device conductive in response to a predetermined level of potential of the trigger means, a control circuit connected to the trigger means and adapted to be connected to a load circuit for varying the potential of the trigger means in response to varying load conditions in the load circuit, and a feed circuit connected to the control circuit feeding a periodic pulse of testing current to the control and load circuits.

12. A reclosing control for a circuit interrupter adapted to be connected between a power circuit and a load circuit which includes a substantial length of feeder wire, at least one load normally of lighter resistance than the predetermined minimum resistance for reclosing the interrupter, and a parallel load of less than said predetermined resistance but of substantially larger inductance than the feeder wire, comprising an electric discharge device, means responsive to the conductive condition of the discharge device for closing the circuit interrupter, trigger means for making the discharge device conductive in response to a level of potential of the trigger means, a control circuit connected to the trigger means and adapted to be connected to the load circuit for varying the potential of the trigger means in response to varying load circuit resistance to reclose the interrupter after the load circuit has at least said predetermined minimum resistance, a feed circuit to supply a periodic pulse of testing current to the control and load circuits, and wave filter elements connecting the feed and control circuits and regulating the rate of change of current at the beginning of each pulse to produce relatively small feeder wire inductive reactance compared to said predetermined minimum resistance but relatively large inductive reactance of said high inductive parallel load compared to said predetermined minimum resistance.

13. A reclosing control for a circuit interrupter, comprising an electric discharge device, means responsive to the conductive condition of the discharge device for closing the circuit interrupter, trigger means for making the discharge device conductive in response to a level of potential of the trigger means, a control circuit connected to the trigger means and adapted to be connected to a load circuit for varying the potential of the trigger means in response to varying load resistance and for changing the trigger means potential to at least the level required to make the discharge device conductive when the load resistance has at least a predetermined minimum resistance, a feed circuit to supply a periodic pulse of testing current to the control and load circuits, said pulse of current having an initial peak value and means to offset the effects of said peak pulse current on the trigger means comprising a resistor between said trigger means and control circuit and a capacitor connected on one side to receive a constant potential and connected on the other side to an intermediate portion of said resistor.

14. A reclosing control for a circuit interrupter adapted to be connected between a power circuit and a load circuit, comprising an electric discharge device, means responsive to the conductive condition of the discharge device for closing the circuit interrupter, trigger means for making the discharge device conductive in response to a predetermined level of potential of the trigger means, a control circuit connected to the trigger means and adapted to be connected to the load circuit for varying the potential of the trigger means in response to varying load conditions in the load circuit, and a feed circuit connected to the control circuit to feed a periodic pulse of testing current to the control and load circuits, said feed circuit including a second electric discharge device having a trigger control to make it conductive to pass testing current, an oscillator circuit connected to operate said last mentioned trigger control periodically to start a pulse of testing current, and a third electric discharge device connected to make the second device nonconductive when the third device becomes conductive, a resistor-capacitor timing circuit connected to the circuit through the second device to begin timing when the second device becomes conductive, and trigger means of the third device connected to the timing circuit to trigger the third device after a timed delay following triggering of the second device, said delay being less than the oscillator period.

15. Apparatus according to claim 14 in which a voltage regulator is connected to the resistor-capacitor timing circuit, whereby the periods of the pulses of testing current are made substantially uniform.

16. Apparatus according to claim 14 in which the two electric discharge devices have cathode heaters, and in which a nonlinear resistor is connected to the control circuit in parallel with said cathode heaters, said nonlinear resistor being effective to hold current through the heaters relatively constant while the interrupter is open regardless of substantial variations of potential of the power circuit.

17. A circuit interrupter adapted to be connected between at least two power circuits and a control circuit for reclosing the open interrupter comprising a pair of electrical discharge devices connected in series to close the interrupter when both devices are conducting, separate conduction trigger means for said devices, control circuits adapted to connect the respective trigger means to the respective power circuits, and a source of testing current connected to said control circuits, said control circuits being adapted to trigger the corresponding discharge devices only when there is at least a predetermined potential on the connected power circuit.

18. A reclosing control for a circuit interrupter adapted to be connected between at least two power circuits, comprising a pair of electrical discharge devices connected in series to close the interrupter when both devices are conducting, separate conduction trigger means for said devices, control circuits adapted to connect the respective trigger means to the respective power circuits and to a source of testing current connected to said control circuits, said control circuits being adapted to trigger the corresponding discharge devices only when there is at least a predetermined potential on the connected power circuit, and said test current means including an electrical discharge device having a trigger control, an oscillator circuit connected to operate said last mentioned trigger control periodically, and means to extinguish said last mentioned electrical discharge device shortly after it is triggered.

19. A reclosing control for a circuit interrupter adapted to be connected between at least two power circuits, comprising a pair of electrical arc-type discharge devices connected in series and adapted to close the interrupter when both devices are conductive, separate trigger means for the devices, a first testing circuit adapted to be connected to one power circuit and the trigger means of one device and a second testing circuit adapted to be connected to the other power circuit and the trigger means of the other device, a feed circuit to supply a periodic pulse of testing current when the interrupter is open, means connecting the feed circuit to supply testing current to each testing circuit while blocking a reverse flow of current, said trigger means of each tube being responsive to a load value in the connected power circuit above a predetermined minimum to make the corresponding discharge device conductive when the feed circuit sends a pulse of testing current, and means to prevent the interrupter from being closed before the next pulse of testing current after the load resistance of both power circuits is above the predetermined limit, said means comprising a resistor and a unidirection conductor connected between at least one testing circuit and the low potential side of the corresponding power circuit, whereby current from said power circuit through said one testing circuit, resistor and conductor lowers the potential on the connected trigger means sufficiently to prevent conductance of the corresponding discharge device until there is a pulse of testing current from the feed circuit.

20. A method of testing for a critical value of load resistance in a circuit having a length of trolley wire in series with the load and a load of relatively small resistance but high inductance in parallel with the load, comprising the steps of producing periodic pulses of testing current, modifying the wave front of each pulse to provide a sufficiently gradual rate of change of current to produce a relatively small amount of inductive reactance in the trolley wire compared to the critical load resistance value but to provide a sufficiently high rate of change of current to produce a high inductive reactance in the parallel inductive load, sending the modified pulse of current through the circuit, and measuring the voltage drop in the circuit while the pulse is passing through it.

21. A reclosing control for a circuit interrupter, comprising a control circuit adapted to be connected between a power circuit and load circuit and including an electric arc-type discharge device for closing the circuit interrupter when the discharge device is conductive, means in the control circuit to make the discharge device conductive when the interrupter is open after the load circuit resistance increases to a predetermined minimum amount, a cathode heater in said discharge device, and a nonlinear resistor connected to the control circuit in parallel with the cathode heater, said nonlinear resistor being effective to hold current through the heater relatively constant while the interrupter is open regardless of substantial variations of potential of the power circuit, whereby the discharge device is prepared for discharge while the interrupter is open.

22. A reclosing control for a circuit interrupter between a power circuit and a load circuit, comprising an electric discharge device having a cathode heater therein, means responsive to the conductive condition of the discharge device for closing the circuit interrupter, trigger means for making the discharge device conductive in response to a predetermined level of potential of the trigger means, a control circuit connected to the trigger means and to the load circuit for varying the potential of the trigger means in response to varying load conditions in the load circuit, said control circuit including a nonlinear resistor connected in parallel with the cathode heater and effective to hold current through the heater relatively constant during substantial variations of potential of the power circuit communicated to the control circuit, and a feed circuit connected to the control circuit feeding a periodic pulse of testing current to the control and load circuits.

References Cited in the file of this patent

UNITED STATES PATENTS

| Number | Name | Date |
|---|---|---|
| 1,483,438 | Hedin | Feb. 12, 1924 |
| 1,796,817 | Waltz | Mar. 17, 1931 |
| 1,872,560 | Breisky | Aug. 16, 1932 |
| 1,883,613 | Divol | Oct. 18, 1932 |
| 1,985,051 | Minkler | Dec. 18, 1934 |
| 2,006,737 | Gessford | July 2, 1935 |
| 2,149,080 | Wolff | Feb. 28, 1939 |
| 2,230,216 | Boers | Jan. 28, 1941 |
| 2,259,965 | Taliaferro | Oct. 21, 1941 |
| 2,424,298 | Bailey | July 22, 1947 |
| 2,463,876 | Hills | Mar. 8, 1949 |
| 2,552,909 | Schurr | May 15, 1951 |